United States Patent [19]

Foley et al.

[11] Patent Number: 4,745,107

[45] Date of Patent: * May 17, 1988

[54] HEPARIN DERIVATIVES WITH IMPROVED PERMEABILITY

[76] Inventors: Kevin M. Foley, 5757 Lynn St., Franklin, Ohio 45005; Charles C. Griffin, 710 Melissa Dr., Oxford, Ohio 45056; Eduardo Amaya, 811 Sands Ave., Monroe, Ohio 45050

[*] Notice: The portion of the term of this patent subsequent to May 17, 2005 has been disclaimed.

[21] Appl. No.: 898,124

[22] Filed: Aug. 20, 1986

[51] Int. Cl.$^4$ .................... A61K 31/725; C08B 37/10
[52] U.S. Cl. ..................................... 514/56; 514/822; 536/21
[58] Field of Search ..................... 514/56, 822; 536/21

[56] References Cited

U.S. PATENT DOCUMENTS

| | | | |
|---|---|---|---|
| 2,999,049 | 9/1961 | Link | 514/56 |
| 3,088,868 | 5/1963 | Windsor | 514/56 |
| 3,482,014 | 12/1969 | Koh | 424/16 |
| 3,506,642 | 4/1970 | Koh | 260/209 |
| 3,510,561 | 5/1970 | Koh | 514/56 |
| 3,546,338 | 12/1970 | Engel | 514/56 |
| 3,548,052 | 12/1970 | Koh | 424/16 |
| 3,574,831 | 4/1971 | Engel | 514/56 |
| 3,574,832 | 4/1971 | Engel | 514/56 |
| 3,577,534 | 5/1971 | Koh | 514/56 |
| 3,835,112 | 6/1971 | Mardiguian | 536/21 |
| 4,239,754 | 12/1980 | Sache | 514/56 |
| 4,281,108 | 7/1981 | Fussi | 536/21 |
| 4,331,697 | 3/1982 | Kudo et al. | 427/2 |
| 4,440,926 | 4/1984 | Mardiguian | 536/21 |
| 4,510,135 | 4/1985 | Teng | 514/56 |
| 4,533,549 | 8/1985 | Lasker | 514/56 |

FOREIGN PATENT DOCUMENTS 2002406 8/1982 United Kingdom ................. 536/21

*Primary Examiner*—John Rollins

[57] ABSTRACT

Heparin derivatives containing hydrophobic groups and exhibiting improved permeability are disclosed. Said derivatives exhibit anticoagulant activity and improved solubility in organic solvents.

31 Claims, No Drawings

HEPARIN DERIVATIVES WITH IMPROVED PERMEABILITY

This invention is related to heparin derivatives possessing improved permeability. Thus, said heparin derivatives have an improved ability to pass through cell membranes. More particularly, the invention concerns heparin derivatives containing hydrophobic groups which impart improved permeability to the heparin while maintaining anticoagulant activity.

Heparin is the most widely used agent for immediate management of most thromboembolic disorders, particularly, deepvein thrombosis and pulmonary and systemic emboli. Treatment times vary depending upon the use. Deep-vein thrombosis and pulmonary embolism are typically treated for 7-10 days. Thromboembolic disorders in pregnancy are typically treated for 2-6 weeks. Coronopathies, myocardiopathies, myocardial infarction and angina pectoris are typically treated for 30 days to many months.

Heparin must be administered by injection or intravenous infusion (parenteral). It is well known that commercial heparin is not capable of crossing the barrier posed by cell membranes such as those found in the intestine and cannot, therefore be an effective therapeutic agent when administered orally or rectally, for example.

The only commercially successful anticoagulant capable of oral administration is warfarin-sodium which is marketed under the trademark "Coumadin, Sodium." See for example U.S. Pat. No. 2,999,049. Warfarin-sodium is a widely used rodenticide and is generally recognized as being inferior to heparin as an anticoagulant. Improving the ability of heparin to pass through membranes as, for example, is necessary in the case of heparin administered orally, rectally, transdermally, or topically, has been the subject of numerous patents. However, none of these products and approaches has proven to be commercially or technically successful.

U.S. Pat. No. 3,088,868 teaches the use of an amino acid adjuvant in conjunction with heparin to enable the heparin to be absorbed from the gastro-intestinal tract.

U.S. Pat. No. 3,482,014 teaches the conversion of a portion of the ionic sites of heparin to the acid form. This permits absorption through the walls of the intestinal tract.

U.S. Pat. No. 3,506,642 teaches conversion of the commercially available sodium heparin to the acid form followed by complexing with a suitable amino acid. This results in complexes which can be absorbed through the walls of the intestine. U.S. Pat. No 3,577,534, which is a continuation in part of U.S. Pat. No. 3,506,642, teaches the use of said complexes in therapeutic compositions wherein the heparin can also be absorbed through the walls of the intestine.

U.S. Pat. No. 3,510,561 teaches the preparation of compositions containing heparin and a sulfone. This permits absorption of the heparin through mucous membranes.

U.S. Pat. No. 3,546,338 teaches the combination of heparin, a metabolizable oil, water and a dispersing agent. Said combination is capable of being absorbed in the alimentary canal of mammals.

U.S. Pat. No. 3,548,052 teaches the use of alkyl sulfoxides, such as dimethyl sulfoxide, in conjunction with heparin to promote the absorption of heparin through mucous membranes.

U.S. Pat. No. 3,574,831 teaches the preparation of compositions containing sodium taurocholate and heparin. These compositions can be absorbed through the walls of the alimentary canal when administered orally or rectally.

U.S. Pat. No. 3,574,832 teaches compositions containing heparin and a surfactant selected from sodium lauryl sulfate, dioctyl sodium sulfosuccinate, sodium hexyl sulfate, sodium lauryl sulfonate, sodium cetyl sulfonate and mixtures thereof.

U.S. Pat. No. 3,835,112 teaches the preparation of heparin esters derived from fatty acids having at least 16 carbon atoms which can be administered orally. These esters are prepared by reacting the Hyamine 1622 salt of heparin with the fatty acid in the presence of a carbodiimide.

U.S. Pat. No. 4,239,754 teaches the use of liposomes with heparin retained therein or thereon. The preparations of this patent are said to be orally active.

U.S. Pat. No. 4,281,108 discloses a process for obtaining low molecular weight heparin comprising acidification of heparin, depolymerization in the presence of peroxides, and sulfation. The molecular weights of the products are 4,000 to 12,000 daltons. Oral activity is claimed.

U.S. Pat. No. 4,331,697 teaches the preparation of heparin derivatives containing an active carbon-carbon double bond wherein the active carbon-carbon double bond is utilized to bond heparin to a biomedical material.

U.S. Pat. No. 4,440,926 teaches the preparation of selected heparin esters by reaction at the carboxyl sites of heparin. Said esters are prepared by reacting a quaternary ammonium salt or amine salt of heparin with an alcohol or a halide.

U.S. Pat. No. 4,510,135 discloses the use of organic ammonium heparin complexes for oral activity.

U.S. Pat. No. 4,533,549 teaches the depolymerization and fractionation of heparin to obtain derivatives in the molecular weight range of 2,500 to 4,000 daltons. Oral activity is claimed for these derivatives. However, the hydrophilic character of the compounds of this patent would be unsatisfactory for effective permeability.

U.K. Pat. No. GB 2,002,406B teaches the sulfation of a low molecular weight heparin having a molecular weight of from 2,600 to 5,500. Oral activity is claimed for the resulting product.

All of the above approaches suffer from shortcomings with regard to increasing the permeability of heparin. Additives, adjuvants, chemical modifications, and heparin derivatives of the prior art have proven to be unwieldy and ineffective.

It is well known that commercial heparin is not capable of crossing the barrier posed by the cell membranes of the intestine (see for example C. Doutremepuich et al., Path. Biol. 32, 45-48 (1984) or U.S. Pat. No. 3,548,052). The tendency of a substance to pass through cell membranes can be measured in terms of a permeability constant ($P$) which is linearly related to the partition coefficient ($r$) between a water immiscible liquid and water itself, and inversely related to the square root of the molecular weight ($M$) of the substance crossing the membrane (see for example J. Diamond and Y. Katz, J. Membr. Biol. 17, 121-154 (1974); J. Danielli, "The Permeability of Natural Membranes", Cambridge University press, Cambridge (1952); A. Kotyk, Biochim. Biophys. Acta 300, 183 (1973)). This is shown in equation form below.

$$P \propto \frac{r}{M^{0.5}}$$

Therefore, in order to increase the permeability constant for heparin, it is necessary to increase its partition coefficient (hydrophobicity) and/or decrease its molecular weight.

DETAILED DESCRIPTION OF THE PREFERRED EMBODIMENTS

It has now been discovered that the permeability of heparin can be significantly increased by the addition of ester groups to heparin. Surprisingly, ester groups containing as few as 2 carbon atoms are effective in significantly increasing the permeability. Preferably, the ester groups contain 3 or more carbon atoms.

We prefer to prepare heparin derivatives having high permeability by allowing a suitable acid chloride to react with heparin. As is apparent to one skilled in the art, a wide variety of reaction conditions and solvents can be used to effect this reaction. The degree of substitution can be changed by varying the ratio of acid chloride to heparin, by varying the solvent or by using no solvent at all, by varying the reaction time and/or by varying the reaction temperature.

As is apparent to those skilled in the art there are many workup procedures which will allow the isolation of heparin derivatives possessing a permeability significantly greater than heparin. We prefer the use of dialysis in the workup procedure to isolate heparin derivatives possessing high permeability.

The chemical structure of heparin is complex. Heparin is not a single compound, but rather is a mixture of compounds. However, heparin is commonly thought to primarily be a polymeric substance made up of tetrasaccharide repeating units. On the average each tetrasaccharide repeating unit contains approximately 5 free hydroxyl groups and has a molecular weight of approximately 1229. The average molecular weight of commercially available heparin varies from about 10,000 to about 18,000. Thus, on the average, commercially available heparin contains approximately 8 to 15 tetrasaccharide repeating units.

Heparin is a mucopolysaccharide composed of amino sugar and uronic acid residues. Heparin is obtained from beef, porcine, sheep, whale, or other mammalian tissue by extraction via procedures known to those skilled in the art. Commercial heparin preparations are now widely available from many sources and are distributed primarily for use as intravascular anticoagulants.

Heparin preparations are known to be heterogeneous on a molecular level. Thus, they exhibit a considerable degree of polydispersity in molecular size, variations in the ratio of glucuronic acid to iduronic acid, alterations in the amount of ester and N-sulfation, and differing extents of N-acetylation. Changes in these parameters have been correlated only to a very limited extent with heparin's anticoagulant potency. Accordingly, it has been widely assumed that its anticoagulant activity is not traceable to a single specific heparin structure, and in any event, no precise relationship between its structure and function has been forthcoming.

Heparin utilized in the practice of this invention may be derived from porcine intestinal mucosa, beef lungs, and whale tissue as well as from other sources known to those skilled in the art. Synthetically derived heparin and heparin-like substances may also be utilized in the practice of this invention. The preferred sources for the heparin used in this invention are porcine intestinal mucosa and beef lungs.

The heparin used in the examples below is porcine mucosal heparin manufactured by Hepar Industries, Inc., Franklin, Ohio. It exhibited a molecular weight of 13684 daltons. Thus, this heparin contained approximately 11.3 tetrasaccharide repeating units.

Without limitation as to the scope of the invention, it is theorized that a preponderance of the ester groups formed by the reaction of an acid chloride with heparin result from the reaction of the free hydroxyl groups of heparin with the acid chloride.

It will be understood that the invention is not limited to the specific examples given herein. Other examples will be obvious to those skilled in the art.

The products of this invention are solids. They can be readily formulated into powders, pills, lozenges, tablets, capsules, ointments, liquids or other suitable forms. Where the compositions are to be swallowed and absorption is to take place in the intestine, the compositions may be given an enteric coating such as cellulose acetate, phthalate, styrene-maleic anhydride copolymers and the like. Enteric coatings are well known to those skilled in the art and are discussed for example in Remington's Practice of Pharmacy or in U.S. Pat. No. 3,126,320.

Preparation of buccal or sublingual tablets and of rectal enemas, suppositories and ointments as well as nasal mists, inhalants and transdermal delivery systems can be easily accomplished.

As used herein, one USP (United States Pharmacopeia) unit of heparin is that quantity which will prevent 1.0 ml of citrated sheep plasma from clotting for one hour after the addition of 0.2 ml of a 1:100 $CaCl_2$ solution.

The following examples are given by way of illustration only and are not to be considered as limiting of this invention.

EXAMPLE I 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 20 milliliters of propionyl chloride was added slowly over a 3–4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE II 0.1 grams of the product of example I was added to 2 milliliters of deionized water. 3 ml of butanol was added. The mixture was mixed well and allowed to undergo freeze/thaw cycles until the top layer (butanol) was clear. The amount of product in each layer was determined by running the uronic acid assay according to E. V. Chandrasekaran and J. N. BeMiller, "Methods in Carbohydrate Chemistry," vol VIII, pages 89-96 (1980) using heparin (porcine intestinal mucosa) standards. The results indicated a butanol/water partition coefficient of $6.7 \times 10^{-3}$.

EXAMPLE III

The number of ester groups per tetrasaccharide unit contained in the product of example I was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 2.9 propionyl groups per tetrasaccharide unit.

EXAMPLE IV

The molecular weight of the product of example I was estimated by taking the sum of the theoretical formula weight of a tetrasaccharide unit (1229) plus 2.9 times the formula weight of a propionyl group less the formula weight of the hydrogen replaced in the heparin (56) and multiplying said sum by the molecular weight of the starting heparin (13684) and finally dividing by the theoretical formula weight of a tetrasaccharide unit (1229). This gave a molecular weight of 15492 for the product of example I.

EXAMPLE V 0.1 grams of heparin (porcine intestinal mucosa) was added to 2 milliliters of deionized water. 3 ml of butanol was added. The mixture was mixed well and allowed to undergo freeze/thaw cycles until the top layer (butanol) was clear. The amount of product in each layer was determined by running the uronic acid assay according to E. V. Chandrasekaran and J. N. BeMiller, "Methods in Carbohydrate Chemistry," vol VIII, pages 89-96 (1980) using heparin (porcine intestinal mucosa) standards. The results indicated a butanol/water partition coefficient (r) of $0.1 \times 10^{-3}$.

EXAMPLE VI

The permeability of the product of example I relative to heparin (porcine intestinal mucosa) was determined as follows. The butanol/water partition coefficient of the product of example I was divided by the square root of the molecular weight of the product of example I. A corresponding value was then obtained for heparin. The value obtained for the product of example I was then divided by the corresponding value for heparin to give 63.0 which is the permeability relative to heparin.

EXAMPLE VII

The infrared spectrum was obtained on the product of example I. An absorption peak was observed at 1737 $cm^{-1}$. This peak is characteristic of an ester group. Said peak was not present in the starting heparin.

EXAMPLE VIII 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 40° C. 40 milliliters of acetyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE IX 0.1 grams of the product of example VIII was added to 2 milliliters of deionized water. 3 ml of butanol was added. The mixture was mixed well and allowed to undergo freeze/thaw cycles until the top layer (butanol) was clear. The amount of product in each layer was determined by running the uronic acid assay according to E. V. Chandrasekaran and J. N. BeMiller, "Methods in Carbohydrate Chemistry," vol VIII, pages 89-96 (1980) using heparin (porcine intestinal mucosa) standards. The results indicated a butanol/water partition coefficient of $0.6 \times 10^{-3}$.

EXAMPLE X

The number of ester groups per tetrasaccharide unit contained in the product of example VIII was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 5.4 acetyl groups per tetrasaccharide unit.

EXAMPLE XI

The molecular weight of the product of example VIII was estimated by taking the sum of the theoretical formula weight of a tetrasaccharide unit (1229) plus 5.4 times the formula weight of an acetyl group less the formula weight of the hydrogen replaced in the heparin (42) and multiplying said sum by the molecular weight of the starting heparin (13684) and finally dividing by the theoretical formula weight of a tetrasaccharide unit (1229). This gave a molecular weight of 16209 for the product of example VIII.

EXAMPLE XII

The permeability of the product of example VIII relative to heparin (porcine intestinal mucosa) was determined as follows. The butanol/water partition coefficient of the product of example VIII was divided by the square root of the molecular weight of the product of example VIII. A corresponding value was then obtained for heparin. The value obtained for the product of example VIII was then divided by the corresponding value for heparin to give 5.51 which is the permeability relative to heparin.

EXAMPLE XIII

The infrared spectrum was obtained on the product of example VIII. An absorption peak was observed at 1740 $cm^{-1}$. This peak is characteristic of an ester group. Said peak was not present in the starting heparin.

EXAMPLE XIV 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 24 milliliters of decanoyl chloride was added slowly over a 3-4 hour period with agitation and agitation continued overnight.

The contents of the flask were placed in a 2000 molecular weight cutoff dialysis bag (Spectrum Medical Industries, Los Angeles, Calif.). Dialysis was conducted against: 95% ethanol for 24 hours, 95% ethanol for 24 hours, 47.5% ethanol for 24 hours, 47.5% ethanol for 24 hours, 1% sodium chloride for 24 hours, 1% sodium chloride for 24 hours and water for 24 hours. The dialysis against water was then repeated.

The contents of the dialysis bag were then lyophilized to obtain a dry, white powder.

EXAMPLE XV 0.1 grams of the product of example XIV was added to 2 milliliters of deionized water. 3 ml of butanol was added. The mixture was mixed well and allowed to undergo freeze/thaw cycles until the top layer (butanol) was clear. The amount of product in each layer was determined by running the uronic acid assay according to E. V. Chandrasekaran and J. N. BeMiller, "Methods in Carbohydrate Chemistry," vol VIII, pages 89–96 (1980) using heparin (porcine intestinal mucosa) standards. The results indicated a butanol/water partition coefficient of $215 \times 10^{-3}$.

EXAMPLE XVI

The number of ester groups per tetrasaccharide unit contained in the product of example XIV was measured following the method of S. Hestrin, J. BIOL. CHEM, vol 180, pages 249–261, 1949. Butyryl choline chloride was used as the ester standard. A theoretical formula weight of 1229 was used for a tetrasaccharide unit. The results indicated the presence of 0.9 decanoyl groups per tetrasaccharide unit.

EXAMPLE XVII

The molecular weight of the product of example XIV was estimated by taking the sum of the theoretical formula weight of a tetrasaccharide unit (1229) plus 0.9 times the formula weight of a decanoyl group less the formula weight of the hydrogen replaced in the heparin (154) and multiplying said sum by the molecular weight of the starting heparin (13684) and finally dividing by the theoretical formula weight of a tetrasaccharide unit (1229). This gave a molecular weight of 15227 for the product of example XIV.

EXAMPLE XVIII

The permeability of the product of example XIV relative to heparin (porcine intestinal mucosa) was determined as follows. The butanol/water partition coefficient of the product of example XIV was divided by the square root of the molecular weight of the product of example XIV. A corresponding value was then obtained for heparin. The value obtained for the product of example XIV was then divided by the corresponding value for heparin to give 2040 which is the permeability relative to heparin.

EXAMPLE XIX

The infrared spectrum was obtained on the product of example XIV. An absorption peak was observed at 1740 cm$^{-1}$. This peak is characteristic of an ester group. Said peak was not present in the starting heparin.

EXAMPLE XX 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 20 milliliters of butyryl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE XXI 0.1 grams of the product of example XX was added to 2 milliliters of deionized water. 3 ml of butanol was added. The mixture was mixed well and allowed to undergo freeze/thaw cycles until the top layer (butanol) was clear. The amount of product in each layer was determined by running the uronic acid assay according to E. V. Chandrasekaran and J. N. BeMiller, "Methods in Carbohydrate Chemistry," vol VIII, pages 89–96 (1980) using heparin (porcine intestinal mucosa) standards. The results indicated a butanol/water partition coefficient of $10.0 \times 10^{-3}$.

EXAMPLE XXII

The number of ester groups per tetrasaccharide unit contained in the product of example XX was measured following the method of S. Hestrin, J. BIOL. CHEM, vol 180, pages 249–261, 1949. Butyryl choline chloride was used as the ester standard. A theoretical formula weight of 1229 was used for a tetrasaccharide unit. The results indicated the presence of 2.3 butyryl groups per tetrasaccharide unit.

EXAMPLE XXIII

The molecular weight of the product of example XX was estimated by taking the sum of the theoretical formula weight of a tetrasaccharide unit (1229) plus 2.3 times the formula weight a butyryl group less the formula weight of the hydrogen replaced in the heparin (70) and multiplying said sum by the molecular weight of the starting heparin (13684) and finally dividing by the theoretical formula weight of a tetrasaccharide unit (1229). This gave a molecular weight of 15477 for the product of example XX.

EXAMPLE XXIV

The permeability of the product of example XX relative to heparin (porcine intestinal mucosa) was determined as follows. The butanol/water partition coefficient of the product of example XX was divided by the square root of the molecular weight of the product of example XX. A corresponding value was then obtained for heparin. The value obtained for the product of example XX was then divided by the corresponding value for heparin to give 94.1 which is the permeability relative to heparin.

EXAMPLE XXV

The infrared spectrum was obtained on the product of example XX. An absorption peak was observed at 1736 cm$^{-1}$. This peak is characteristic of an ester group. Said peak was not present in the starting heparin.

The above description is for the purpose of teaching the person skilled in the art how to practice the present invention. This description is not intended to detail all of the obvious modifications and variations of the invention which will become apparent upon reading. However, the applicants do intend to include all such obvious modifications and variations within the scope of their invention which is defined by the following claims.

We claim:

1. An aliphatic ester of heparin containing more than 0.1 ester groups per tetrasaccharide unit.

2. An ester of claim 1 wherein the ester is prepared by reacting an acid chloride with the heparin.

3. An ester of heparin formed by replacing the free hydroxyl groups of heparin with ester groups, said ester characterized by a butanol water (3:2) partition coefficient greater than $1 \times 10^{-4}$.

4. An ester of claim 3 wherein the ester is prepared by reacting an acid chloride with the heparin.

5. An ester of claim 3 wherein more than 50% of the ester groups are aliphatic.

6. An ester of claim 5 containing more than 0.1 ester groups per tetrasaccharide unit.

7. An ester of claim 3 wherein more than 50% of the ester groups are aliphatic.

8. An ester of claim 7 containing more than 0.1 ester groups per tetrasaccharide unit.

9. An ester of heparin formed by replacing the free hydroxyl groups of heparin with ester groups, said ester characterized by a relative permeability, as compared to heparin, of 1.5 or greater.

10. An ester of claim 9 wherein the ester is prepared by reacting an acid chloride with the heparin.

11. An ester of heparin formed by replacing the free hydroxyl groups of heparin with ester groups and containing more than 0.1 ester groups per tetrasaccharide unit and having a butanol water (3:2) partition coefficient greater than $1 \times 10^{-4}$.

12. An ester of claim 11 wherein the ester is prepared by reacting an acid chloride with the heparin.

13. An ester of claim 12 wherein more than 50% of the ester groups are aliphatic.

14. An aliphatic ester of heparin formed by replacing the free hydroxyl groups of heparin with ester groups, said ester containing more than 0.1 ester groups per tetrasaccharide unit.

15. An ester of claim 14 wherein the ester is prepared by reacting an acid chloride with the heparin.

16. An ester of heparin characterized by a butanol water (3:2) partition coefficient greater than $1 \times 10^{-4}$ wherein the ester is prepared by reacting an acid chloride with the heparin.

17. An ester of heparin characterized by a relative permeability, as compare to heparin, of 1.5 or greater wherein the ester is prepared by reacting an acid chloride with the heparin.

18. An ester of heparin containing more than 0.1 ester groups per tetrasaccharide unit and having a butanol water (3:2) partition coefficient greater than $1 \times 10^{-4}$ wherein the ester is prepared by reacting an acid chloride with the heparin.

19. An ester of heparin characterized by a butanol water (3:2) partition coefficient greater than $1 \times 10^{-4}$ wherein the ester is prepared by reacting an acid chloride with the heparin and wherein more than 50% of the ester groups are aliphatic.

20. An ester of claim 19 containing more than 0.1 ester groups per tetrasaccharide unit.

21. An ester of heparin characterized by a butanol water (3:2) partition coefficient greater than $1 \times 10^{-4}$ wherein more than 50% of the ester groups are aliphatic.

22. An ester of claim 21 containing more than 0.1 ester groups per tetrasaccharide unit.

23. An ester of heparin characterized by a relative permeability, as compared to heparin, of 1.5 or greater wherein the ester is prepared by reacting an acid chloride with the heparin and wherein more than 50% of the ester groups are aliphatic.

24. An ester of claim 23 containing more than 0.1 ester groups per tetrasaccharide unit.

25. An ester of heparin characterized by a relative permeability, as compared to heparin, of 1.5 or greater wherein more than 50% of the ester groups are aliphatic.

26. An ester of claim 25 containing more than 0.1 ester groups per tetrasaccharide unit.

27. An ester of heparin containing more than 0.1 ester groups per tetrasaccharide unit and having a butanol water (3:2) partition coefficient greater than $1 \times 10^{-4}$ wherein the ester is prepared by reacting an acid chloride with the heparin and wherein more than 50% of the ester groups are aliphatic.

28. An ester of heparin formed by replacing the free hydroxyl groups of heparin, said ester characterized by a butanol water (3:2) partition coefficient greater than $1 \times 10^{-4}$ wherein the ester is prepared by reacting an acid chloride with the heparin and wherein more than 50% of the ester groups are aliphatic.

29. An ester of claim 28 containing more than 0.1 ester groups per tetrasaccharide unit.

30. An ester of heparin formed by replacing the free hydroxyl groups of heparin, said ester characterized by a relative permeability, as compared to heparin, of 1.5 or greater wherein the ester is prepared by reacting an acid chloride with the heparin and wherein said ester contains more than 0.1 ester groups per tetrasaccharide unit.

31. A pharmaceutically active composition comprising a pharmaceutically acceptable carrier or diluent and, as the pharmaceutically active component, a product as claimed in any one of claims 1, 4, 5, 10, 7–15 or 16, 30.

* * * * *